United States Patent Office 3,405,074
Patented Oct. 8, 1968

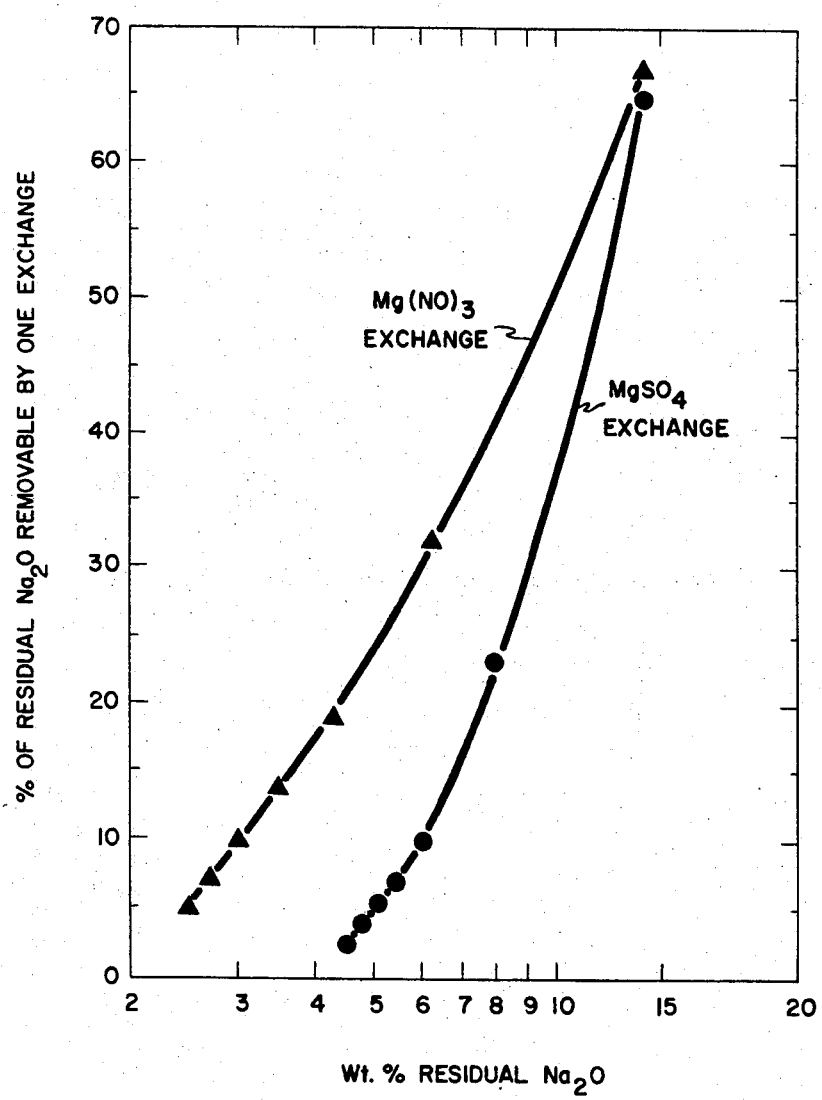

3,405,074
MAGNESIUM-CONTAINING CRYSTALLINE
ZEOLITES
William Judson Mattox, Baton Rouge, La., assignor to
Esso Research and Engineering Company, a corporation of Delaware
Filed Dec. 27, 1963, Ser. No. 333,844
13 Claims. (Cl. 252—455)

ABSTRACT OF THE DISCLOSURE

The ion exchange of synthetic faujasite with $MgNO_3$ achieves lower residual sodium level, higher magnesium level and improved stability.

---

This invention relates to a process for preparing magnesium-containing crystalline zeolites having improved stability. Particularly, it relates to an improved method for incorporating magnesium into crystalline alkali metal alumino-silicate zeolites by ion exchange with magnesium nitrate solutions. More particularly, it relates to the incorporation of up to about 14 wt. percent magnesium (calculated as MgO) into synthetic faujasite.

Crystalline alumino-silicate zeolites, commonly referred to as "molecular sieves," are well known in the art. They are characterized by their highly ordered crystalline structure and uniformly dimensioned pores, and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e., not adsorbed) by a particular sieve. A number of these zeolite materials are described, for example, in U.S. Patent 3,013,982, wherein they are characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes.

In general, the crystalline alumino-silicate zeolites within the purview of the present invention may be represented by the following formula, expressed in terms of moles:

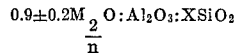

wherein M is selected from the group consisting of metal cations and hydrogen, $n$ is its valence, and X is a number from about 1.5 to about 12. The value of X will vary with the particular zeolite in question. Among the well-known natural zeolites are mordenite, faujasite, chabazite, gmelinite, analcite, erionite, etc. Such zeolites differ in structure, composition, and particularly in the ratio of silica to alumina contained in the crystal lattice structure, e.g. mordenite, having a ratio of about 8 to about 12; faujasite, having a ratio of about 2.5 to about 7, etc. Similarly, the various types of synthetic crystalline zeolites, e.g., synthetic faujasite, mordenite, etc., will also have varying silica to alumina ratios depending upon such variables as composition of crystallization mixture, reaction conditions, etc. U.S. Patents Nos. 3,013,982–86 describe a number of synthetic zeolites, designated therein as zeolite A, D, L, R, S, T, X and Y.

The processes for producing such crystalline synthetic zeolites are well known in the art. Typically, they involve crystallization from reaction mixtures containing: $Al_2O_3$ as sodium aluminate, alumina sol and the like; $SiO_2$ as sodium silicate and/or silica gel and/or silica sol; alkali metal oxide, e.g., sodium hydroxide, either free or in combination with the above components; and water. Careful control is kept over the alkali metal oxide concentration of the mixture, the proportions of silica to alumina and alkali metal oxide to silica, the crystallization period, etc., to obtain the desired product.

The zeolite which will be most preferred in the present invention is the synthetic faujasite variety, wherein X in the above formula is about 2.5 to 7, preferably 3 to 6, most preferably 4 to 5.5. It will usually have an average pore diameter of about 9 to 15, preferably 10 to 13 A. A conventional scheme for preparing sodium synthetic faujasite is as follows:

Colloidal silica or silica hydrosol is mixed with a solution of sodium hydroxide and sodium aluminate at ambient temperature. Suitable reactant molar ratios are within the following ranges: $Na_2O/SiO_2$, 0.28 to 0.80; $SiO_2/Al_2O_3$, 7 to 40; $H_2O/Na_2O$, 20 to 60. The reaction mixture is preferably allowed to digest at ambient temperature for up to 40 hours or more, preferably 1 to 15 hours, in order to aid crystallization after which it is heated at 180° to 250° F., e.g., 200° to 220° F., for a sufficient period to crystallize the product and to achieve maximum crystallinity, e.g., 24 to 200 hours or more, typically 50 to 100 hours. A crystalline hydrated sodium alumino-silicate zeolite having a faujasite structure is then separated from the aqueous mother liquor by decantation or filtration, washed, and dried to recover a crystalline product. It may then be finally calcined at temperatures up to about 1000° F. in order to remove the water of hydration and thereby form interstitial channels which confer adsorptive and catalytic properties.

The present invention is concerned with treatment of above-described zeolites, in the hydrated form (i.e., prior to calcination and dehydration). In the naturally-occurring or synthetic zeolites, M in the above general formula is usually an exchangeable metal cation, and typically is a monovalent alkali metal cation, e.g., sodium, lithium or potassium. This cation may be partially or completely exchanged by conventional ion-exchange techniques with a variety of monovalent and divalent cations, including, for example, ammonium, calcium, magnesium, etc.

As previously indicated, these crystalline zeolites have recently gained wide acceptance as catalysts and catalyst supports for hydrocarbon conversion processes, e.g., catalytic cracking, hydrocracking, etc. This has proven particularly true of the synthetic faujasite type of zeolite. When these zeolites are to be used as catalysts, they must necessarily be treated with a suitable exchange solution to reduce their alkali metal oxide (e.g., $Na_2O$) content to less than about 10 wt. percent, preferably less than about 6 wt. percent, since alkali metal oxides do not promote the desired hydrocarbon conversion reactions. Accordingly, the alkali metal oxide content is customarily reduced by ion exchange treatment with solutions of ammonium salts, or salts of metals in Groups I to VIII or the rare earth metals, preferably metals in Groups II, III, IV, V, VI–b, VII–b, VIII and rare earth metals. The ion exchange can be accomplished by slurrying the zeolite product with an aqueous solution of the desired cation at temperatures of about 60° to 150° F. to replace the alkali metal, and washing the resulting base-exchanged material free of soluble ion prior to drying. Suitable salt solutions have included, for example, magnesium sulfate, calcium chloride, barium chloride, iron sulfate, ammonium hydroxide, ammonium chloride, etc.

For certain hydrocarbon conversion processes, and in particular catalytic cracking, the "magnesium form" of these zeolites has proven to be highly effective. (By "magnesium form" is meant the form of the zeolite after it has been base-exchanged with a magnesium salt solution to reduce the alkali metal content.) It is to the preparation of this form of zeolite which the present invention primarily relates. It has been recognized that the magnesium content of the zeolite should preferably be maximized in order to minimize the alkali metal content of the zeolite. However, the reduction in alkali metal content per exchange treatment is relatively small, and even with a large number of exchange treatments, an "equilibrium" point is eventually reached. For example, when sodium snythetic faujasite, having a typical initial sodium content of about 13.5 to 14.0 wt. percent (as $Na_2O$), is exchanged with magnesium chloride or magnesium sulfate solution, an equilibrium residual sodium level of about 4 to 6, e.g., 5 to 6, wt. percent (as $Na_2O$) is eventually reached, below which further reduction is difficult to achieve. However, residual sodium levels below this value, e.g., less than about 2 to 3 wt. percent, are most desirable, particularly when the zeolite is to be used as a catalytic agent. Accordingly, it will be appreciated that provision of a relatively simple means for reducing the sodium content to these low levels will represent a valuable contribution to the art.

It has now been surprisingly discovered that the anion present in the exchange salt solution has a marked effect on the degree of alkali metal ion replacement. Specifically, it has been discovered that nitrate salts demonstrate a remarkably greater degree of exchange than other salts under comparable exchange conditions. This discovery is particularly appropriate to the aforementioned formation of the "magnesium form" of crystalline zeolites, and most particularly to the exchange treatment of synthetic faujasite. By means of this discovery, the alkali metal content of crystalline zeolites can be reduced by as much as 85 to 95% or more. As a particular example, exchange of synthetic faujasite with magnesium nitrate solution can produce residual sodium levels of as low as 0.2 to 2 wt. percent (as $Na_2O$).

It has also been surprisingly discovered that, in addition to the remarkable exchange power of the nitrate salts, the exchanged zeolite products treated with the nitrate salts remarkably exhibit improved high temperature stability. Accordingly, crystalline zeolites having a prolonged life of useful service are created. Thus, for example, treatment of sodium synthetic faujasite with magnesium nitrate to reduce the residual sodium oxide content to the aforementioned relatively low levels, additionally results in an outstanding improvement in thermal and steam stability, as compared to exchange with the other conventionally used magnesium salts under comparable conditions.

In its broadest aspects the present process comprises contacting a crystalline alumino-silicate zeolite, having an initial alkali metal oxide content within the range of about 11 to 20, preferably about 12 to 15 wt. percent, with an aqueous magnesium nitrate solution, to reduce said alkali metal oxide content to about 6 wt. percent or less, preferably within the range of about 0.2 to 6 wt. percent, more preferably 0.2 to less than 5 wt. percent, most preferably 0.2 to 3 wt. percent. The resulting zeolite will have a magnesium content of about 3.5 to 14 wt. percent, preferably 6 to 13 wt. percent, calculated as MgO. The crystalline zeolite will preferably be of the synthetic faujasite variety (i.e., it will have a typical faujasite structure, as determined by X-ray diffraction analysis).

In a more preferred embodiment of the invention, the nitrate exchange treatment is performed on the zeolite after it has been exchanged by conventional treatment to reduce the sodium level to near the aforementioned "equilibrium value," i.e., about 4 to about 6, e.g., 5 to 6 wt. percent $Na_2O$. This initial conventional exchange treatment may be performed with a variety of magnesium salts, e.g., the sulfate, chloride, perchlorate, acetate, thiosulfate, etc. Thus, this embodiment of the invention comprises two steps: (1) reducing the alkali metal oxide content of the zeolite from the aforementioned initial alkali metal oxide content of about 11 to about 20, preferably about 12 to 15 wt. percent to an intermediate sodium "equilibrium" content of about 4 to about 6, e.g., 5 to 6 wt. percent by conventional ion-exchange treatment; and (2) treating this partially-exchanged zeolite with magnesium nitrate solution to further reduce the alkali metal oxide content to the aforementioned low residual level of about 6 wt. percent or less, preferably about 0.2 to 6, more preferably 0.2 to less than 5 wt. percent, most preferably 0.2 to 3 wt. percent. The MgO content at the "equilibrium" level will be about 3.5 to 10, preferably about 4 to 7 wt. percent. Again, synthetic faujasite will be especially preferred.

In effect, therefore, the present invention provides a unique method for both reducing the residual alkali metal oxide, e.g., $Na_2O$, content of crystalline zeolites from the above-stated readily attainable equilibrium value, to the low levels hereinbefore set forth; and increasing the stability of the zeolite structure.

The magnesium nitrate ion exchange treatment is performed at a temperature of from about 50° to about 200° F., preferably about 75° to 150° F. The magnesium nitrate concentration of the exchange solution may vary from about 0.5 to about 25 wt. percent preferably about 1 to 10 wt. percent. The weight ratio of magnesium salt to zeolite in a given exchange will usually be about 0.2:1 to 5:1, e.g., 0.5:1 to 2:1. The ion exchange can be carried out in conventional batch-wise or column-wise procedure at the above temperature, until the desired degree of exchange has been realized. When batch-wise treatment is used, the zeolite is filtered between successive treatments. Typically, about 4 to about 6 batch-wise exchange treatments will be required to reduce the alkali metal oxide of the zeolite from its initial value to the low residual value; and about 1 to about 3 treatments will be required to reduce the alkali metal content from its "equilibrium value" to the low residual value. Suitable treating times will include about 0.15 to 2, preferably about 0.3 to 1, hours per exchange.

After the ion exchange treatment or treatments, the exchanged magnesium-containing zeolite is water washed to remove soluble salts and is then calcined in a dry atmosphere by gradually increasing the temperature to about 750° to 1000° F. and holding at said temperature for a sufficient period of time to drive off the water of hydration and thereby activate the zeolite. The zeolite may be further modified depending upon its intended use. For example, it may be impregnated with a platinum group metal, e.g., palladium, by treatment with a solution of an ammoniacal complex or salt of such metal. Such modified zeolites containing, for example, up to 5 wt. percent platinum group metal have been found useful as catalysts in hydrocracking processes.

The invention will be further understood by reference to the following examples, which are not intended to be limiting.

Example 1.—Preparation of crystalline zeolite

Samples of the sodium form of synthetic faujasite were prepared by the following typical procedure and served as the starting materials for subsequent ion-exchange treatments to illustrate the process of the present invention. A solution of (1) commercial sodium aluminate containing 38 wt. percent $Na_2O$, 38 wt. percent $Al_2O_3$, and 24 wt. percent $H_2O$, and (2) sodium hydroxide containing 75 wt. percent $Na_2O$ in water was added to (3) a commercially available aqueous sol of colloidal silica containing about 30 wt. percent $SiO_2$ and a weight ratio of soda-to-silica equal to 1:285 ("Ludox" solution supplied by E. I. duPont de Nemours & Co.), under rapid stirring conditions at ambient temperature, e.g., about 75° F., to form an essentially homogeneous mixture. The homogeneous reaction mixture was aged for about 10 hours at ambient temperature and then heated to and held at a temperature of about 200° to 215° F., e.g., 210° F., until the product sufficiently crystallized. The crystallization period was determined by the length of time necessary to produce maximum crystallinity of product, as measured by periodically withdrawing a sample and analyzing for crystallinity by X-ray diffraction techniques. The crystallization step was terminated by quenching the reaction mixture with large volumes of cold water. The crystalline product was then separated from the mother liquor by filtration, thoroughly water-washed until the wash water had a pH of about 9.3, and finally dried at a temperature of about 130° C.

The silica-to-alumina ratio of the product will depend upon the proportions of the above ingredients used. For example, to produce a silica-to-alumina ratio of about 4.2, the following amounts of ingredients were used: 6870 grams of 97% NaOH, 1513 grams of sodium aluminate, 37.6 kg. of silica sol, and 27 liters of water. To produce a silica-to-alumina ratio of about 5.3, the above amounts of ingredients were adjusted as follows: 6000 grams of NaOH, 1700 grams of sodium aluminate, 38.6 kg. of silica sol, and 21.5 liters of water. The sodium synthetic faujasites prepared by the above procedure had uniform pore diameters of about 13 A. and total sodium contents prior to ion exchange of about 13.7 to 14.0 wt. percent $Na_2O$.

Example 2.—Ion-exchange of crystalline zeolite

Samples of the sodium synthetic faujasite prepared by the procedure of Example 1 were ion-exchanged with various magnesium salt solutions and analyzed for $Na_2O$ and MgO content as summarized in the following table. In these exchanges the concentrations of the exchange solution and the weight ratios of magnesium salt to zeolite were as follows: for the chloride, 14.5 wt. percent and 0.4:1; for the sulfate, 17.3 wt. percent and 0.5:1; for the perchlorate, 32.2 wt. percent and 1:1; for the nitrate, 21.0 wt. percent and 0.7:1. The treating time per exchange was sufficient to produce an equilibrium state and was typically about one hour. With the exception of Exchange 15 a single magnesium salt was used. Exchange 15 illustrates a two-step exchange treatment. The zeolite was filtered and water-washed between successive exchanges.

tially reduce the $Na_2O$ level to 2.7 wt. percent. This low soda content is further verified by the correspondingly high MgO content of 9.1 wt. percent. The beneficial effect of the nitrate anion on the degree of exchangeability is thus demonstrated.

To further demonstrate this effect, another comparison was made between the exchange power of magnesium nitrate and magnesium sulfate. Samples of sodium synthetic faujasite prepared by he procedure of Example 1 having an $Na_2O$ content of 14.0 wt. percent and an $SiO_2/Al_2O_3$ ratio of 5.3 were exchanged with aqueous solutions of magnesium sulfate and magnesium nitrate. Six successive exchanges were made at 160° F. with continuous stirring for two hours. The samples were separated by filtration between successive exchanges and, without substantial water-washing, were reslurried in fresh exchange solution. After the sixth and final exchange, the samples were thoroughly water-washed to remove soluble salts. The following analytical data show the substantially greater effectiveness of the nitrate salt for replacing the soda in the faujasite.

TABLE II

| Exchange salt | $Mg(NO_3)_2$ | $MgSO_4$ |
|---|---|---|
| Exchange solution, wt. percent salt | 1.0 | 1.2 |
| $Na_2O$ content of faujasite, wt. percent: | | |
| Unexchanged | 14.0 | 14.0 |
| Exchange No. 1 | 6.3 | 7.9 |
| Exchange No. 2 | 4.3 | 6.1 |
| Exchange No. 3 | 3.5 | 5.5 |
| Exchange No. 4 | 3.0 | 5.1 |
| Exchange No. 5 | 2.7 | 4.8 |
| Exchange No. 6 | 2.5 | 4.6 |

The greater effectiveness of magnesium nitrate in replacing the sodium ions with magnesium is thus shown at all $Na_2O$ levels. It is further demonstrated that magnesium nitrate exchange is capable of reducing the $Na_2O$ content to substantially lower ultimate residual levels than magnesium sulfate exchange.

Further analysis of the data in Table II indicates that at any residual $Na_2O$ level, the amount of $Na_2O$ which

TABLE I.—ION-EXCHANGE OF SYNTHETIC FAUJASITE WITH MAGNESIUM SALT SOLUTIONS

| Ex. No. | $SiO_2/Al_2O_3$ Mole Ratio of Zeolite | Exchange | | | Wt. Percent $Na_2O$ | Wt. Percent MgO |
|---|---|---|---|---|---|---|
| | | Mg Salt | Number of Exchanges | Temp., °F. | | |
| 1 | 4.2–5.3 | None | | | 13.7–14.0 | 0 |
| 2 | 4.2 | Chloride | 3 | 150 | 5.5 | 4.0 |
| 3 | 4.2 | do | 3 | 150 | 4.3 | 5.3 |
| 4 | 4.2 | do | 3 | 150 | 5.5 | 5.8 |
| 5 | 4.2 | do | 6 | 150 | 5.3 | 6.5 |
| 6 | 4.2 | do | 8 | 150 | 4.7 | 6.6 |
| 7 | 5.3 | Sulfate | 1 | 80 | 7.3 | 5.6 |
| 8 | 5.3 | do | 2 | 80 | 6.3 | 6.3 |
| 9 | 5.3 | do | 3 | 80 | 6.1 | 5.5 |
| 10 | 5.3 | do | 3 | 80 | 4.9 | 5.5 |
| 11 | 5.3 | do | 4 | 80 | 4.9 | 5.8 |
| 12 | 5.3 | do | 5 | 80 | 4.8 | 5.8 |
| 13 | 5.3 | Perchlorate | 4 | 80 | 6.2 | 5.1 |
| 14 | 5.3 | Nitrate | 3 | 80 | 6.0 | 5.2 |
| 15 | 4.2 | Chloride Nitrate | 8 1 | 150 80 | 4.7 2.7 | 6.6 9.1 |

As indicated in the above table, conventional ion exchange, even after 8 treatments, will reduce the $Na_2O$ level to only about 4.7–4.9 wt. percent. Moreover, the type of magnesium salt utilized appears to have little significance on the extent of ion exchange. Even the nitrate salt, in the initial three exchanges (Exchange 14), had an exchange power about equivalent to the other salts. However, the ability of the nitrate salt to reduce the $Na_2O$ level to very low residual levels is strikingly demonstrated in Exchange 15. In this two-step procedure, while eight exchanges with the chloride salt were required to reduce the $Na_2O$ level to 4.7 wt. percent, only one additional exchange with the nitrate salt was able to further substantially reduce the $Na_2O$ level to 2.7 wt. percent. This low can be removed by one exchange treatment is considerably higher when the nitrate salt is utilized. This is graphically illustrated in the accompanying drawing. For example, referring to the drawing, when the faujasite has a residual $Na_2O$ content of 6.0 wt. percent, one exchange with the sulfate will remove an additional 10%, whereas one exchange with the nitrate will remove an additional 30%. This is shown to be particularly pertinent at the lower residual levels, i.e., below 6 wt. percent $Na_2O$, where the amount removed per exchange is relatively small for the sulfate and relatively high for the nitrate, thus demonstrating the advantageous use of the nitrate salt at these lower levels.

Example 3.—Thermal stability of exchanged zeolites

The following data illustrate the greater thermal stability of the nitrate-exchanged magnesium-form zeolite of Example 2, Exchange 15, as compared to the chloride-exchanged zeolite of Example 2, Exchange 6. Samples of the exchanged zeolites were dried at 650° F. and then calcined in air at high temperature conditions of 1500° F. for 6 and 16 hours, after which their crystallinities were measured by X-ray diffraction analysis. The values shown below are expressed as percentages of a standard laboratory sample of synthetic faujasite taken as having a crystallinity of 100. Table III summarizes the results obtained.

TABLE III.—THERMAL STABILITY OF MAGNESIUM SYNTHETIC FAUJASITE (4.2 $SiO_2/Al_2O_3$ MOLE RATIO)

| Product of Exchange No. | Mg Exchange Salt | Percent $Na_2O$ | Crystallinity after— | | |
|---|---|---|---|---|---|
| | | | 2 Hrs. at 650° F. | 6 Hrs. at 1,500° F. | 16 Hrs. at 1,500° F. |
| 6 | Chloride | 4.7 | 149 | 74 | 0 |
| 15 | Chloride Nitrate. | 2.7 | 149 | 111 | 0 |

A significant improvement in thermal stability at 1500° F. is shown for the product of Exchange 15 which was treated with magnesium nitrate solution to reduce its $Na_2O$ content to a low residual level. While both samples lost their crystallinity after 16 hours at 1500° F., this is believed to be due to the low $SiO_2/Al_2O_3$ mole rato (i.e., 4.2).

Samples having higher $SiO_2/Al_2O_3$ mole ratios (i.e., 5.3) were similarly treated, with the results summarized in Table IV.

TABLE IV.—THERMAL STABILITY OF MAGNESIUM SYNTHETIC FAUJASITE (5.3 $SiO_2/Al_2O_3$ Mole Ratio)

| Product of Exchange No. | Magnesium Exchange Salt | Percent $Na_2O$ | Percent $MgO$ | Crystallinity after— | |
|---|---|---|---|---|---|
| | | | | 2 Hrs. at 650° F. | 16 Hrs. at 1,500° F. |
| 9 | $MgSO_4$ | 6.1 | 5.5 | 145 | 0 |
| 13 | $Mg(ClO_4)_2$ | 6.2 | 5.1 | 130 | 119 |
| 14 | $Mg(NO_3)_2$ | 6.0 | 5.2 | 158 | 132 |

As indicated, while the above three products had essentially the same $Na_2O$ and $MgO$ contents the nitrate-treated product of Exchange 14 demonstrated substantially higher thermal stability at both 650° F. and 1500° F. The unusual performance of the nitrate anion, which has not heretofore been appreciated is thus demonstrated. It should be noted that the product of Exchange 14 was not exchanged to the low residual sodium level (e.g., 2.7%) but nevertheless exhibited high stability. It is evident, therefore, that the present invention provides two independent benefits, namely; (1) a more rapid and complete degree of sodium exchange; and (2) production of zeolites having higher thermal stability with a resulting prolonged life of useful service.

To demonstrate the improved steam stability of the magnesium nitrate-exchanged zeolites, the magnesium nitrate product and magnesium sulfate product were first calcined in air at 900° F. and then steamed for 16 hours at 1200° F. The results are shown in Table V.

TABLE V.—STEAM STABILITY OF MAGNESIUM SYNTHETIC FAUJASITE

| Product of Exchange No. | Exchange Salt | Crystallinity after— | | Percent Crystallinity Retained After 16 Hrs. Steam at 1,200° F. |
|---|---|---|---|---|
| | | Air Calcination at 900° F. | 16 Hrs. Steam at 1,200° F. | |
| 14 | $Mg(NO_3)_2$ | 102 | 72 | 71 |
| 9 | $MgSO_4$ | 139 | 51 | 37 |

These data clearly show the superior stability characteristics of the products obtained from the nitrate exchange in high temperature steam, a property closely related to the useful life of such materials in commercial processes such as adsorption, catalytic cracking, etc.

What is claimed is:

1. A process for reducing the alkali metal oxide content of a crystalline alumino-silicate zeolite which comprises contacting said zeolite with a magnesium nitrate solution at a temperature of about 160° F.

2. The process of claim 1, wherein said zeolite is synthetic faujasite.

3. The process of claim 1, wherein said alkali metal is sodium.

4. The process of claim 1, wherein said zeolite has an initial alkali metal oxide content of about 11 to 20 wt. percent and said contacting is continued until said alkali metal oxide content has been reduced to about 6 wt. percent or less.

5. The process of claim 1, wherein said zeolite has an initial alkali metal oxide content of about 4 to 6 wt. percent and said contacting is continued until said alkali metal oxide content has been reduced to about 0.2 to less than 5 wt. percent.

6. A process for reducing the alkali metal oxide content of synthetic faujasite by replacement of said alkali metal with magnesium, said synthetic faujasite initially containing about 11 to 20 wt. percent of said alkali metal oxide, which process comprises successively contacting said faujasite with a magnesium nitrate solution at a temperature of about 160° F. until the alkali metal oxide content has been reduced to about 0.2 to 6 wt. percent and the magnesium content of said faujasite is about 3.5 to 14 wt. percent, calculated as magnesium oxide.

7. The process of claim 6, wherein said alkali metal is sodium.

8. The process of claim 6, wherein said synthetic faujasite has a silica-to-alumina ratio of about 2.5 to 7 and an average pore diameter of about 9 to 15 A.

9. A process for reducing the alkali metal oxide content of synthetic faujasite by replacement of said alkali metal with magnesium, said synthetic faujasite initially containing about 11 to 20 wt. percent of said alkali metal oxide, which process comprises initially contacting said faujasite with a solution of a magnesium salt other than magnesium nitrate until said alkali metal oxide content has been reduced to about 4 to 6 wt. percent, and subsequently contacting said faujasite with a magnesium nitrate solution until said alkali metal oxide content has been reduced to about 0.2 to less than 5 wt. percent.

10. The process of claim 9, wherein said contacting with magnesium nitrate reduces said alkali metal oxide content to about 0.2 to 3 wt. percent.

11. The process of claim 9, wherein said alkali metal is sodium.

12. The process of claim 9, wherein said magnesium salt other than magnesium nitrate is selected from the group consisting of magnesium sulfate, magnesium chloride and magnesium perchlorate.

13. The process of claim 9, wherein said synthetic faujasite has a silica-to-alumina ratio of about 2.5 to 7 and an average pore diameter of about 9 to 15 A.

References Cited

UNITED STATES PATENTS

| 3,104,270 | 9/1963 | Mattox et al. | 252—455 |
| 3,130,006 | 4/1964 | Rabo et al. | 23—112 |
| 3,140,252 | 7/1964 | Frilette et al. | 252—455 |
| 3,140,322 | 7/1964 | Frilette et al. | 252—455 |

DANIEL E. WYMAN, *Primary Examiner.*

C. F. DEES, *Assistant Examiner.*